US006551645B1

(12) United States Patent
Hauser et al.

(10) Patent No.: US 6,551,645 B1
(45) Date of Patent: Apr. 22, 2003

(54) PROCESS FOR MANUFACTURING A PASTA PRODUCT

(75) Inventors: Thomas Wilhelm Hauser, Reutlingen (CH); Robert Gerald Odermatt, Frauenfeld (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/684,326

(22) Filed: Oct. 10, 2000

(30) Foreign Application Priority Data

Oct. 15, 1999 (EP) .............................. 99203386

(51) Int. Cl.⁷ ................................. A23L 1/16
(52) U.S. Cl. ................ 426/557; 436/451; 436/516
(58) Field of Search ................ 426/516, 557, 426/451

(56) References Cited

U.S. PATENT DOCUMENTS 4,076,846 A    2/1978   Nakatsuka et al. ............ 426/62
4,360,332 A   11/1982   Cyin ........................... 425/191
4,394,397 A    7/1983   Lometillo et al. ........... 426/557
4,521,436 A    6/1985   Lou et al. .................... 426/104
4,886,440 A   12/1989   Forrest et al. ............... 425/208
5,667,833 A    9/1997   Juengling et al. ............ 426/496

FOREIGN PATENT DOCUMENTS

| EP | 0 084 831     | 8/1983  |
| EP | 0 342 831 A2  | 11/1989 |
| EP | 0 350 552 A1  | 1/1990  |
| EP | 0 416 825 A2  | 8/1990  |
| JP | 06261704      | 9/1994  |

*Primary Examiner*—Lien Tran
(74) *Attorney, Agent, or Firm*—Winston & Strawn

(57) ABSTRACT

A process for preparing a pasta product by extruding dry or semi-dry ground cereal. The dry or semi-dry ground cereal has a water content of less than about 20 percent by weight of the ground cereal. A pasta product prepared by the process is disclosed.

13 Claims, No Drawings

PROCESS FOR MANUFACTURING A PASTA PRODUCT

FIELD OF THE INVENTION

The present invention relates to a pasta product and to a process for manufacturing the pasta product.

BACKGROUND ART

U.S. Pat. No. 4,076,846 discloses an edible molding composition comprising starch, sodium caseinate, glycerol, and an emulsifier, which may be used for manufacturing biodegradable packaging films or containers by extrusion or injection molding.

U.S. Pat. No. 4,886,440 discloses an injection molding apparatus and process for manufacturing food or pet food products having tridimensional shapes, such as a bone shape for dogs or fish shape for cats, from a mixture of meat meal and wheat flour.

SUMMARY OF THE INVENTION

The present invention relates to a process for manufacturing a pasta product. The process involves extruding a dry or semi-dry ground cereal having a water content of less than about 20 percent by weight of the ground cereal at a pressure of from about 10 to 500 Mpa to provide a pasta product. The pressure may be from about 30 to 450 Mpa. The water content of the ground cereal may be between about 8 and 20 percent by weight of the ground cereal flour. The ground cereal may be flour or semolina of Durum or hard wheat, rice, corn, or a mixture thereof. The process may further include adding to the ground cereal one or more additives selected from the group consisting of protein, soft wheat flour, egg material, sodium chloride, spices, and mixtures thereof. The process may also include a step wherein the ground cereal is heated to a temperature of from about 30 to 150° C. The pasta product may be dried to a residual water content of from about 6 to 13% by weight of the pasta product.

The dry or semi-dry ground cereal may be extruded using a device comprising a piston and a nozzle; an extruder and a nozzle; a gear pump and a nozzle; injection molding equipment comprising a barrel, screw, and nozzle; or a string press comprising a piston, recipient, and die. The dry or semi-dry ground cereal may be extruded using a device comprising a screw enclosed in a jacketed barrel, the screw being rotatable and longitudinally translatable in the barrel, with the barrel having a downstream end terminating with a nozzle. The dry or semi-dry ground cereal may also be extruded using a device comprising a piston, a press plate or a lock, a recipient, and a die.

The invention also relates to a pasta product prepared according to the method of the invention.

DETAILED DESCRIPTION OF THE PREFERRED EMBODIMENTS

The present invention is directed to a novel method for making a pasta product. The process involves dry or semi dry extrusion of a ground cereal. The resulting pasta product is a dry or semi-dry, ground cereal extrusion product.

The phrase "dry or semi dry extrusion," as used herein means extrusion wherein no additional water is added to or only a relatively small amount of water is added to the ground cereal that is extruded.

The ground cereal used to manufacture the pasta product may be, for example, a flour or semolina of Durum or hard wheat, rice, corn, or a mixture thereof.

One or more additional additives may be added to the ground cereal before it is extruded. The one or more additional additives include, but are not limited to, wheat protein, especially gliadin enriched wheat protein; soft wheat flour; egg material; sodium chloride; spices; and the like.

Wheat protein, especially gliadin enriched wheat protein, such as the product marketed under the name Lavor Pro (commercially available from Midwest Grain Products, Inc. Of Atchison, Kans.), may be used in an amount of from about 0.5 to 5 percent, preferably about 1 to 3 percent by weight, in order to reduce stickiness and improve firmness of the cooked pasta.

Soft wheat flour may be added in order to increase the elasticity of the pasta product. The soft wheat flour is added in conventional amounts.

Egg material in the form of whole egg powder, egg white powder, or liquid whole egg may be added in order to increase the firmness of the pasta product. The egg material is added in conventional amounts.

In the process of the invention, no water, or only a very small amount of water, is added the ground cereal that is extruded. The ground cereal that is extruded has a total water content of less than about 20%, preferably from about 8 to 20%.

The mixture of dry or semi-dry ground cereal with wheat protein, soft wheat flour, egg material, sodium chloride, spices, and water may be prepared by any means available to those or ordinary skill in the art. For example, the mixture may be prepared with traditional bread or pasta making equipment such as baker's mixer and kneader, paddle mixer, mono- or twin screw kneader, or in the barrel of traditional equipment for injection molding of plastics.

The dry or semi-dry ground cereal or mixture of dry or semi-dry ground cereal and additives is extruded under a pressure of from about 10 to 500 MPa, preferably about 30 to 450 Mpa, and more preferably about 40 to 425 Mpa.

The dry or semi-dry ground cereal or mixture of dry or semi-dry ground cereal and additives may be heated to a temperature of from about 30 to 150° C., preferably from about 30 to 120° C., and more preferably from about 30 to 90° C. before or during the extrusion step. Therefore, it is preferable that the extrusion means is capable of heating the mixture and can be temperature controlled.

Any type of extrusion means available to those of ordinary skill in the art may be used to extrude the dry or semi-dry ground cereal or mixture of dry or semi-dry ground cereal and additives. The extrusion means may comprise, for example, a piston and a nozzle; an extruder and a nozzle; a gear pump and a nozzle; the barrel, screw, and nozzle of a traditional equipment for the injection moulding of plastics; or the piston, the recipent and the die of a string press for pressing of metal wires.

In one embodiment, the extrusion is carried out with equipment typically used for injection molding plastics, wherein the extruder comprises a screw enclosed in a jacketed barrel, the screw being rotatable and longitudinally translatable in the barrel, and the barrel has a downstrean end terminating in a nozzle.

In another embodiment the extrusion is carried out with typical equipment for pressing metal wires, wherein the extrusion means comprises a piston, a press plate or a lock, a recipient, and a die.

The dry or semi dry extruded pasta product emerging from the extruder has a water content of less than about 20 percent, preferably from about 8 to 20 by weight of the pasta product. The resulting pasta product may have any gelatinization degree, i.e., the gelatinization degree may be from 0 to 100%.

Optionally, the dry or semi dry extruded pasta product may be further dried to a residual water content of from about 6 to 13%.

Conventional methods of manufacturing pasta typically involve extruding a dough that comprises 2 parts flour with 1 part of water (i.e., 33 percent water). The process of the present invention, however, extrudes dry or semi-dry ground cereal having a much lower water content of less than about 20%. Thus, the resulting pasta product contains less water and can be dried more easily and efficiently. Surprisingly, the method of the invention provides a pasta products having a unique texture and good organoleptical properties which are comparable to those of traditional pasta products.

EXAMPLES

The invention is further defined by reference to the following examples describing in detail the process and device of the present invention. The examples are representative, and they should not be construed to limit the scope of the invention. All percentages and parts are by weight, unless otherwise indicated.

Example 1

A pasta product having a spaghetti shape was manufactured by a semi dry extrusion process using, as the extrusion means, a model 270M injection molding apparatus (commercially available from ARBURG AG of Losburg, Germany).

A mixture of Durum wheat semolina and added water (3.9%) was prepared in a paddle mixer to provide a mixture having a final water content of 18%. The mixture was introduced into the barrel of the injection molding equipment where it was kneaded and heated to a temperature of 80° C. The kneaded mixture was then extruded under a pressure of 65 MPa through a nozzle having a diameter of 3.5 mm. The resulting extruded pasta product had a water content of 14.2% and was dried to a residual water content of 12.5%. The pasta product had a unique texture and its organoleptical properties were comparable with those of regular Durum wheat spaghetti.

Examples 2 to 4

Pasta products were manufactured as disclosed in Example 1 with varying amounts of added water and under different extrusion pressures. The extrusion conditions and the water contents of the extruded pastas are provided in Table 1. The pasta products had a unique texture and organoleptical properties comparable with those of regular Durum wheat spaghetti.

TABLE 1

| Example No | | 1 | 2 | 3 | 4 |
| --- | --- | --- | --- | --- | --- |
| Added water | (%) | 3.9 | 2.9 | 1.9 | 0 |
| Water content of mixture or semolina to be extruded | (%) | 18 | 17 | 16 | 14.1 |
| Extrusion pressure | MPa | 65 | 88 | 120 | 150 |
| Water content of extruded pasta | (%) | 14.2 | 12.9 | 12.0 | 10.6 |
| Residual water content | (%) | 12.5 | 12.9 | 12.0 | 10.6 |

Example 5

A pasta product having a spaghetti shape was manufactured using, as the extrusion means, a horizontal, hydraulic, 7500 kN COLLIN stringpress. The stringpress was filled with Durum semolina without any water added. The semolina was pushed by the piston of the stringpress and dry extruded under a pressure of 400 MPa through a circular die opening having a diameter of 2.0 mm. The temperature of the semolina increased to about 60 to 80° C. under the effect of pressure and friction. The resulting dry extruded pasta product had a diameter of 2.8 mm, a residual water content of 12%, a smooth surface and organoleptical properties comparable with those of regular Durum wheat spaghetti.

What is claimed is:

1. A process for manufacturing a pasta product, comprising extruding a dry or semi-dry ground cereal having a water content less than about 20 percent by weight of the ground cereal at a pressure of from about 40 to 500 Mpa to provide a pasta product.

2. The process of claim 1, wherein the water content of the ground cereal is between about 8 and 20 percent by weight of the ground cereal.

3. The process of claim 1, wherein the ground cereal comprises a flour or semolina of Durum or hard wheat, rice, corn, or mixtures thereof.

4. The process of claim 1, further comprising adding to the ground cereal one or more additives selected from the group consisting of protein, soft wheat flour, egg material, sodium chloride, spices, and mixtures thereof.

5. The process of claim 1, further comprising heating the ground cereal to a temperature of from about 30 to 150° C. before or during extruding.

6. The process of claim 1, further comprising drying the pasta product to a residual water content of from about 6 to 13% by weight of the pasta product.

7. The process of claim 1, wherein the dry or semi-dry ground cereal is extruded using a device, wherein the device comprises a piston and a nozzle; or an extruder and a nozzle; or a gear pump and a nozzle; or injection molding equipment comprising a barrel, screw, and nozzle; or a string press comprising a piston, recipient, and die.

8. The process of claim 1 wherein the dry or semi-dry ground cereal is extruded using a device comprising a screw enclosed in a jacketed barrel, the screw being rotatable and longitudinally translatable in the barrel, and the barrel having a downstream end terminating with a nozzle.

9. The process of claim 1, wherein the dry or semi-dry ground cereal is extruded using a device comprising a piston, a press plate or a lock, a recipient, and a die.

10. A process for manufacturing a pasta product, comprising extruding a dry or semi-dry ground cereal having a water content less than about 20 percent by weight of the ground cereal at a pressure of from about 40 to 500 Mpa and at a temperature from about 30 to 150° C. to provide a pasta product.

11. The process of claim 10, further comprising adding to the ground cereal one or more additives selected from the group consisting of protein, soft wheat flour, egg material, sodium chloride, spices, and mixtures thereof.

12. The process of claim 10, wherein the water content of the ground cereal is between about 8 and 18 percent by weight of the ground cereal.

13. The process of claim 10, wherein the ground cereal comprises a flour or semolina of Durum or hard wheat, rice, corn, or mixtures thereof.

* * * * *